(12) United States Patent
Peer

(10) Patent No.: US 10,340,710 B2
(45) Date of Patent: Jul. 2, 2019

(54) CHARGING DEVICE FOR THE INDUCTIVE TRANSMISSION OF ELECTRICAL ENERGY AND METHOD FOR OPERATING THE CHARGING DEVICE

(71) Applicant: AUDI AG, Ingolstadt (DE)

(72) Inventor: Reinhard Peer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 58 days.

(21) Appl. No.: 15/542,955

(22) PCT Filed: Dec. 18, 2015

(86) PCT No.: PCT/EP2015/080398
§ 371 (c)(1),
(2) Date: Jul. 12, 2017

(87) PCT Pub. No.: WO2016/113071
PCT Pub. Date: Jul. 21, 2016

(65) Prior Publication Data
US 2018/0006474 A1   Jan. 4, 2018

(30) Foreign Application Priority Data

Jan. 14, 2015 (DE) ........................ 10 2015 000 437

(51) Int. Cl.
*H02J 7/00* (2006.01)
*H02J 17/00* (2006.01)
(Continued)

(52) U.S. Cl.
CPC ............ *H02J 7/0029* (2013.01); *H02J 7/025* (2013.01); *H02J 17/00* (2013.01); *H02J 50/10* (2016.02); *B60L 53/12* (2019.02)

(58) Field of Classification Search
CPC ......... B60L 11/182; H02J 17/00; H02J 50/10; H02J 7/0029; H02J 7/025
See application file for complete search history.

(56) References Cited

U.S. PATENT DOCUMENTS

2012/0119569 A1    5/2012  Karalis et al.
2014/0009112 A1*   1/2014  Fontana .............. B60L 11/1827
                                                    320/109

FOREIGN PATENT DOCUMENTS

DE          2434890 B1    11/1975
DE     102009047504 A1     6/2011
(Continued)

OTHER PUBLICATIONS

Notification of Transmittal of Translation of the International Preliminary Report on Patentability dated Jul. 27, 2017, in connection with corresponding international application No. PCT/EP2015/080398 (8 pgs.).

(Continued)

*Primary Examiner* — Vuthe Siek
(74) *Attorney, Agent, or Firm* — Maier & Maier, PLLC

(57) ABSTRACT

A charging device for inductive transfer of electric energy with a primary conductor arranged in a first housing, by which an alternating magnetic field can be generated when it is energized with an alternating current, electrically connected to a power source that is electrically connectable to a power electronics device for energizing the primary conductor with an alternating current. A drive means for moving the first housing from a first position to a second position, wherein the charging device is equipped with a fault detecting device, by which can be detected whether the first housing is or is not moved when a movement operation has been initiated by the drive means.

12 Claims, 1 Drawing Sheet

(51) Int. Cl.
*H02J 50/10* (2016.01)
*H02J 7/02* (2016.01)
*B60L 53/12* (2019.01)

(56) References Cited

FOREIGN PATENT DOCUMENTS

| | | |
|---|---|---|
| DE | 102011118397 A1 | 5/2012 |
| DE | 102011076186 A1 | 11/2012 |
| DE | 102012208005 A1 | 11/2013 |
| DE | 102012220913 A1 | 5/2014 |
| DE | 102013100019 A1 | 7/2014 |
| JP | 201022183 A | 1/2010 |
| WO | 20121058466 A1 | 5/2012 |

OTHER PUBLICATIONS

Examination Report dated Sep. 24, 2015 of corresponding German application No. 10 2015 000 437.9; 7 pgs.
International Search Report and Written Opinion dated Mar. 17, 2016 of corresponding application No. PCT/EP2015/080398; 13 pgs.

\* cited by examiner

CHARGING DEVICE FOR THE INDUCTIVE TRANSMISSION OF ELECTRICAL ENERGY AND METHOD FOR OPERATING THE CHARGING DEVICE

FIELD

The present invention relates to a charging device for inductive transmission of electric energy and to a method for operating the charging device.

BACKGROUND

In motor vehicles that are (also) driven with an electric motor, such as for example electric and hybrid vehicles, rechargeable storage devices are predominantly used to supply electric power to electric traction motors provided in the vehicle based on the current technology, which are generally referred to as batteries. On known example of these batteries is represented by lithium-ion batteries.

Different technical solutions are in principle available for the charging of the batteries, in particular for wired and inductive power transmission (contactless, free of cables).

The wired power transmission has disadvantages because handling of electric cables is required, while another problem is the compatibility of plugs and sockets, as well as the potential deterioration of contacts when plugging and unplugging of the electric cable is frequently required.

With inductive charging of a battery (often referred to as Wireless Power Transfer or "WPT"), the transfer of energy is carried out with the aid of an alternating magnetic field which is generated in the primary conductor on the side of the infrastructure (primary coil, for example ground coil). A voltage that is induced (electromagnetic induction) with this alternating magnetic field in a secondary conductor (secondary coil) is used in order to charge the battery (so-called "transformer principle").

To the extent that the terms "primary conductor" or "secondary conductor" are used in this application and in reference to the present invention, these terms are intended in each cases to include also the design or the embodiment of a "primary coil" or a "secondary coil", or of "primary coils" or "secondary coils".

When inductive charging is used to charge a battery of a motor vehicle that can be (also) driven with an electric motor, this is particularly useful for a driver because the handling of an electric cable is no longer necessary. It can be also provided that the charging occurs automatically as soon as the motor vehicle is parked at a charging space that is provided with an inductive charging device. Therefore, even comparatively short stops of the driver can be used for at least a partial charging of the battery.

The advantages of inductive energy transfer mentioned above must in particular respect requirement for safety and they must be also compatible with electromagnetic (environmental) requirements. In addition, so that inductive charging of a battery could be carried out efficiently, the primary conductor and the secondary conductor must be overlapping and they should be placed so that the distance maintained between the primary conductor and the secondary conductor is as small as possible. In particular, the size of the air gap between the primary conductor and the secondary conductor of vehicles that are (also) driven with an electric motor, which is often used for charging of batteries, may not exceed a predetermined maximum distance (a desirable distance is 1.0 to 2.0 cm).

Therefore, it is known that especially with so called ground-based charging devices, in which the primary conductor is arranged in a housing that is located in/on the ground, a motor vehicle provided with a secondary conductor (for example an electric vehicle) can be controlled with radio signals, or controlled by the driver in such a way that a very accurate overlapping of the primary and secondary conductor can be achieved. Furthermore, systems that are provided with at least one sensor element are also known, in which for example an optically functioning sensor, such as a laser, Lidar or a scanner system are built to detect a path through which an electric motor vehicle can be guided to a charging station.

Moreover, to provide an optimal distance and compensation that will be as complete as possible for a given offset between a primary and secondary conductor can be achieved for example when, after a motor vehicle makes a stop at a charging station, the primary conductor is moved in the direction of the secondary coil, or the secondary coil is moved in the direction of the primary coil, wherein a movement of the respective coil can be made in one, two or all three spatial directions.

However, with a large number of ground-based charging stations for electric vehicles, for example at the side of the road and in parking car parks, the problem is that sufficient protection of the ground-based charging stations has not been achieved yet. That is why in ground-based charging stations, but also in other charging stations for an inductive transmission of electric energy in which the primary conductor or a housing with the primary conductor can be moved to achieve the goals mentioned above, the problem is that at temperatures around and below the freezing point, freezing of the primary conductor or of the housing which contains the conductor, which can become frozen to the surrounding ground or floor, to the road surface, or to other devices surrounding the housing of the primary conductor, etc., can occur, which means that it is then not possible to move the primary conductor.

From DE 24 34 890 B1 is known an inductive charging device in which a transformer part that is associated with a parking space is provided with structural elements in the form of heating spirals generating electric loss with heat so as to keep ice off the dome surface of a charging plank in winter.

Also, DE 10 2011 076 186 A1 describes an arrangement for providing a remedy during a fault of a wireless energy transfer with a first component, which may be for example mounted on a roadway and which is provided with a fault recovery means, wherein the fault recovery means may be provided in addition to an existing coil for the induction with a heating element for melting ice or snow, or for drying the first component.

SUMMARY OF THE DISCLOSURE

The object of the present invention is to provide an improved charging device for inductive transfer of electric energy that is improved when compared to known prior art, and a novel and an inventive method for operating the charging device.

These objects are achieved with the charging device according to claim 1, and with the method for operating the charging device that is attained according to claim 11.

Advantageous developments of the invention are the subject of the dependent claims.

According to the invention, a charging device for inductive transmission of electric energy is proposed, which is provided with a primary conductor arranged in a first housing, by means of which can be generated an alternating magnetic field with energizing created with an alternating current, a power electronics device that is electrically connected to the primary conductor and to the power supply system for energizing the primary coil with an alternating current, as well as a drive means for moving the first housing from a first position to a second position.

The charging device according to the invention is characterized in that it is equipped with a fault detection device, by means of which can be detected whether the first housing was or was not moved during a movement operation initiated with the drive means, and which is configured, in the case when a movement of the first housing was not detected in spite of the movement operation initiated with the drive means, to control the power electronics device with the drive means in such a way that the primary conductor will be energized with an electric current to raise the temperature of the primary conductor (heating).

The charging device according to the invention has the advantage that based for example on environment conditions, when the presence of ice and/or of snow is not unlikely and therefore there is a risk that the first housing could freeze solid and become attached to the ground (surface) and/or when another instance of solid freezing or freezing up of other elements of the drive means cannot be excluded, in contrast to known prior art, its temperature is increased with a suitable and optionally controlled energizing of the of the primary conduct so that melting of the ice and/or snow present at the first housing can then result in creating a neutral component.

In addition, the heat of the primary conductor is radiated to the drive means that is connected to the first housing, so that not only the ice/snow present on/at the first housing, but also the ice and snow present at the drive means can be melted as well.

According to a first advantageous embodiment of the invention, the fault detection device is configured so that in the case when no movement of the first housing takes place in spite of the initiation of a movement operation with the drive means, the power electronics are controlled in such a way that the primary conductor is energized to raise temperature with a electric current having direct current component.

According to a second advantageous embodiment of the charging device, further included is also a temperature detection means for detecting the temperature of the primary conductor and/or of the first housing, so that the first fault detection means can receive the signals of the temperature detection device and is adapted so that in the case when a movement of the first housing does not take place in spite of initiating of a movement operation by the drive means, and in spite of the fact that the temperature of the primary conductor and/or of the first housing is below a pre-determinable first threshold temperature, the primary conductor is energized with an electric current so as to raise the temperature of the primary conductor.

The advantage of this further development of the charging device is that in case of a fault of the movement operation, a distinction is made between a fault that is due to a temperature-related malfunction and a fault that is caused by another interference.

According to a third advantageous further development of the charging device, the fault detection device is adapted to control the power electronics device such that the temperature of the primary conductor and/or of the first housing is raised when the primary conductor is energized with an electric current to raise the temperature of the primary conductor to a pre-determinable second threshold temperature.

This can prevent the temperature of the primary conductor and/or of the first housing from being increased above a pre-determinable second threshold temperature. Therefore, damage to the components of the charging device that is due to temperature and other problems can be also prevented, such as for example hand burns and the like caused by contact with the components of the charging device.

At the same time, precautions can be taken so that when the temperature of the primary conductor and/or of the first housing is increased when a current flows through the primary conductor in order to increase the temperature of the primary conductor to a suitable temperature (for example +5° C., +10° C., +15° C., +20° C., +25° C., +30° C., +35° C., +40° C., +45° C., +50° C., +55° C., or +60° C.), so that melting of existing ice and/or snow could take place within reasonable period of time as desired.

According to a further advantageous development of the invention, the power electronics device of the charging device is arranged in a second housing, wherein at least the outer surface of the second housing is in a first position of the first housing at least immediately adjacent to at least one outer surface of the first housing.

When the primary conductor is energized according to the invention, this will for technical reasons result not only in an increased temperature of the primary conductor, but also of other components of the power electronics. The heat of the components of the power electronics can be delivered to the second housing. In particular when the second housing is at least partially made of metal, the heat that is supplied to the second housing can be rapidly distributed throughout the second housing due to the good thermal conductivity characteristics of metal. Since the second housing may be immediately adjacent with at least one of its outer surface to at least one outer surface of the first housing, ice/snow that may be present in the area between the respective outer surfaces of the first and of the second housing can be particularly quickly melted away in the case when this kind of proximity is present, so that the time period required until the movement operation can be carried out as desired or as required can be also kept short.

According to yet another preferred embodiment of the charging device, the power electronics are adapted to energize the primary conductor for an inductive transmission of electric energy with an alternating current in a frequency range of 50 kHz to 100 kHz, preferably from 70 kHz to 100 kHz, particularly preferably from 80 kHz to 90 kHz.

The charging device may be configured in an advantageous manner as a ground-based charging device and the driving means can be configured to ensure in the installed state when it is installed in the ground-based driving device an optimal distance of the first housing to the charging device and/or the most precise overlapping of the secondary conductor from the charging device, obtained with a movement of the first housing (from a first position to a second position), wherein the alternating magnetic field of the primary conductor induces an electric current so that it can be transferred to a rechargeable storage device for storage of electric energy.

It can also be provided that the drive means of the charging device is configured to tilt, pivot or shake the first housing.

According to yet another advantageous further development of the charging device, the charging device may be provided with a sensor device by means of which objects can be detected at least on the other surface of the first housing.

The present invention relates also to a method for operating a charging device or to advantageous embodiments thereof, comprising the following stops:

providing a charging device according to the invention or advantageous embodiments thereof, detecting by means of a fault detection device of the charging device whether the first housing has or has not been moved when a movement operation of the first housing has been initiated with the drive means, in the case when it is detected that a movement of the first housing initiated by the drive means has not taken place, the power electronics device is controlled by the fault detection device in such a way that the primary conductor is energized with an electric current to raise the temperature of the primary conductor (heating).

According to a first advantageous development of the method in the case when it is detected that the movement operation of the first housing initiated by the first driving means has not taken place, the power electronics device is controlled by the fault detection device such that the primary conductor is energized with a direct current component so that the primary conductor is energized in order to raise the temperature.

According to a second advantageous further development, the method can further comprise:

detecting the temperature of the primary conductor and/or of the first housing by means of a temperature detection device, and in the case when it is detected that the movement of the first housing did not take place when a movement temperature has been initiated by the driving means and the temperature of the primary conductor and/or of the first housing is below a pre-determinable first threshold temperature, the control of the power electronics device is exercised in such a way that the primary conductor is energized in order to raise the temperature.

It can be also provided that the fault detection electronics device controls the power electronics in such a way that the temperature of the primary conductor and/or of the first housing is increased when it is energized with an electric current to increase the temperature of the primary conductor to a second pre-determinable threshold.

Further developments, encompassed by the present invention and embodiments of the method according to the present invention and derived on the basis of the description of the charging device, as well as \of the function and/or interaction of its components, or of the description of advantageous further developments and embodiments of the charging device or figures, as well as of their descriptions, can be easily obtained by a person skilled in the art.

The present invention will now be explained in more detail with reference to the attached figures.

BRIEF DESCRIPTION OF THE DRAWINGS

The figures show the following.

The illustrations shown in the figures are purely schematic and not to scale. The same or similar elements are provided with the same reference numerals in the figures.

The examples of embodiments explained below represent preferred embodiment forms of the present invention. However, the present invention is of course not limited to these embodiment forms.

DETAILED DESCRIPTION

Figure 1:
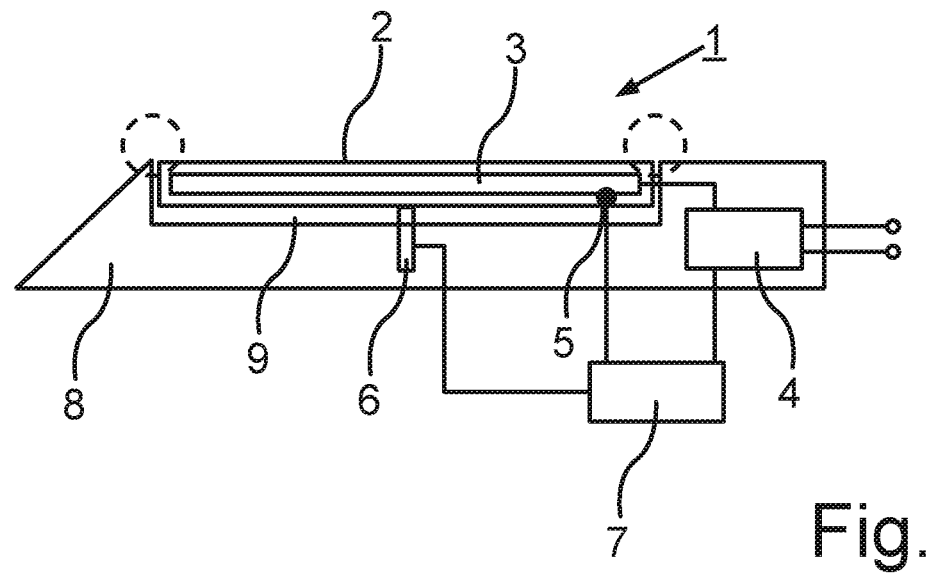
FIG. 1: a schematic sectional view of an example of a charging device according to the present invention.

FIG. 1 shows schematically and not to scale an embodiment of a charging device 1 according to the present invention. The charging device 1 is in this example provided with a first housing 2, in which is arranged a primary conductor 3. The first housing 2 can be formed from any suitable material. With the first housing 2 it is only necessary to ensure that at least the side of the first housing 2 that is provided with a secondary conductor facing the direction of the charging operation is permeable to electromagnetic fields. The first housing 2 can be formed for example fully or partially from a suitable plastic material. In order to avoid the penetration of dirt and/or of moisture into the first housing 2, it is preferably completely closed and optionally provided with openings for the passage of lines, which can be sealed in a suitable manner.

The primary conductor 2 is generally formed as a primary coil 3, which can be for example wound around a ferrite or iron core. A preferred material for the primary conductor is copper.

So that inductive transmission of electric energy could take place, the primary conductor 3 must be energized with an alternating current at a frequency in the range from a few multiples of 10 kHz, (approximately from 30 kHz, 40 kHz, 50 kHz, 60 kHz, 70 kHz, 80 kHz), up to the MHz range. According to a preferred embodiment of the charging device 1, the power electronics device 4 is configured to energize the primary conductor 3 for inductive transmission of electric energy with an alternating current at a frequency in the range from 50 kHz to 100 kHz, preferably 70 kHz to 100 kHz, particularly preferably from 80 kHz to 90 kHz.

Figure 2:
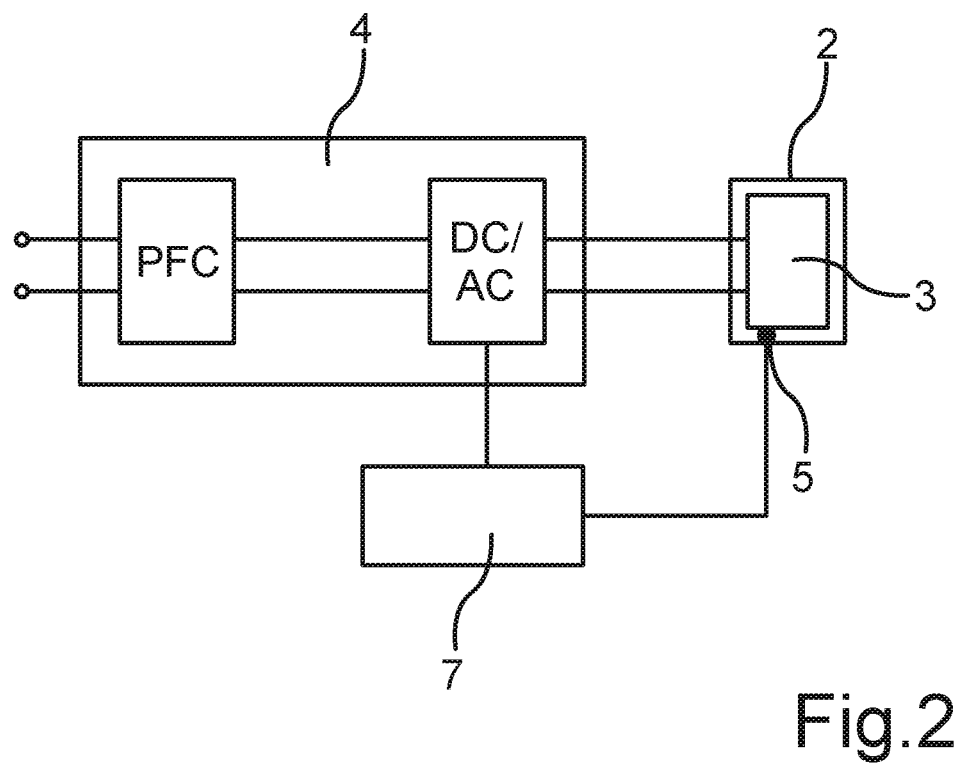
FIG. 2 a schematic diagram of an example of a power electronics device of the charging device.

In order to generate this alternating current, the charging device 1 is equipped with a power electronics device 4, which is electrically connected with the primary conductor 3 and which can be electrically connected to a power grid. A possible example of a suitable power electronics device 4 is schematically illustrated in FIG. 2. The power electronics device 4, which is adapted to be connected to an alternating or three-phase power supply, is provided with an active or passive power factor correction filter (PFC=Power Factor Correction), so that it can be connected to an alternating current or a three-phase power supply. The direct current (direct current intermediate circuit) is fed to an inverter (DC/AC), by means of which the desired high-frequency alternating current can be generated for an inductive energy transmission.

With a suitable control of an inverter by the fault recognition device 7, it is possible to generate also an electric current that will be used for the most part only to raise the temperature.

No particular restrictions per se are imposed on the type of the electric current that is used to increase the temperature of the primary conductor 3. So for example, both alternating current and direct current can be used. Energizing of the primary conductor 3 can be also used to increase its temperature when no secondary conductor is arranged adjacent to the primary conductor 3. Therefore, it is possible that the magnetic field generated by the primary conductor 3 will not be "absorbed" by a secondary conductor. Given this background, a person skilled in the art will of course pay attention to applicable regulations for electromagnetic compatibility (EMC) and electromagnetic environmental compatibility (EMEC) during operations according to this invention.

An electric current with a direct current component may be according to this invention for example a "purely" direct current, which is supplied for a predetermined first period of time to the primary conductor 3, and remains turned off for a predetermined second period of time.

The first and the second time period may be selected to have the same length or a different length, and suitable duty cycles can be employed. It is also possible for a "pulsing" direct current to be used as a current with a direct current component.

When the power electronics device is controlled in such a way that an electric current is used to heat the primary conductor, either static electromagnetic fields (such as those that are generated when a direct current is used) are created, or as a result, electromagnetic alternating fields may be generated at a lower frequency, wherein the "lower frequencies" are to be understood as frequencies from more than 0 Hz up to 30 kHz. Such electromagnetic alternating fields have advantages, when compared to higher frequencies such as those in the range from 50 kHz to 100 kHz that are used for inductive energy transmission, namely advantages relating to their electromagnetic compatibility (EMV) or electromagnetic environmental compatibility (EMEC).

The electromagnetic current to be used to raise the temperature of the primary conductor 3 can be switched on for example for 0.2 sec, 0.3 sec, 0.4 sec, 0.5 sec, 0.6 sec, 0.7 sec, 0.8 sec, 0.9. sec, 1.0 sec, 1.1 sec. 1.2 sec, 1.3 sec, 1.4 sec, 1.5 sec, 1.6 sec, 1.7 sec, 1.8 sec, 1.9 sec, or 2. sec and it can be then turned off for a time period of for example 0.2 sec, 0.3 sec, 0.4 sec, 0.5 sec, 0.6 sec, 0.7 sec, 0.8 sec, 0.9. sec, 1.0 sec, 1.1 sec. 1.2 sec, 1.3 sec, 1.4 sec, 1.5 sec, 1.6 sec, 1.7 sec, 1.8 sec, 1.9 sec, or 2. sec. In this case, all conceivable combinations can be used and both the switched-on-time period and the switched-off-time period can be varied during the course of the energizing.

At the same time, it is of course also possible that the electric current is turned on uninterruptedly until the movement operation can be carried out.

The strength of the electric current that is used to increase the temperature of the primary conductor is in principle limited only by the design or by the performance of the semiconductor in the inverter. Also, the strength and/or duration of the electric current used to increase the temperature of the primary conduct is selected in such a way so as to avoid damaging or premature aging of the elements of the charging device 1. With the aid of an available temperature detection device 5, the temperature of the primary conductor 3 and/or of the first housing 2 can be also monitored and the strength and/or the duration of the current that is used to increase the temperature can be selected in such a way that an excessive temperature increase of the primary conductor 3 and/or of the first housing 2 is avoided. A temperature detection device can be of course also provided in the power electronics device 4 and its temperature can be taken into account also for the corresponding setting of the strength and/or for the duration of the period when electric current is used to increase the temperature of the primary conductor 3.

It is thus possible to achieve heating of the primary conductor 3 with the energizing of the primary conductor 3 with an electric current to increase the temperature of the primary conductor as described above with a procedure that is neutral to structural components. Since the primary conductor is located in the first housing and this housing is connected with a drive means 6 for moving the first housing 2, the heat of the primary conductor 3 can be relatively quickly transmitted to the housing 2 and optionally also to the drive means 6.

If icing is present for example in the locations of the housing 2 that are indicated by circles with dashed lines, in particular the "icing" of the charging device 1, then a movement of the first housing, for example upward, should be carried out by means of the drive means 6, or it should not be carried out because the second housing 8 is frozen to the first housing 2.

The charging device 1 according to the present invention solves in particular the problems encountered with the practical application of the charging device 1 when it is employed without any protection from the influence of weather factors including ice and/or snow on/at the charging device 1. These problems include in particular "freezing" of the charging device 1, wherein a movement of the first housing 2 to put it closer to and/or align it with the first housing 2 with a secondary conductor may be impossible. That is why according to the invention, a prerequisite for energizing the primary conductor 3 with an electric current to increase the temperature of the primary conductor is that it is detected with the fault detection device 7 that the first housing 2 was not moved in spite of the fact that a movement operations was initiated with the drive means 6 (for example in preparation for inductive charging of a battery or within the scope of a test procedure). This detection can be carried out with all known devices and methods.

So for example, torque control can be implemented, or a measurement of the distance between a surface of the first housing 2 and a predetermined point can be carried out as a function of time, etc.

Another precondition that can be provided for energizing the primary conductor 3 to increase the temperature of the primary conductor with an electric current is that the temperature of the primary conductor 3 and/or of the first housing 2 is below a predetermined first threshold temperature.

As another threshold temperature can be selected for example the temperature of 4.0° C., 3.5° C., 3.0° C., 2.5° C., 2.0° C., 1.5° C., 1.0° C., 0.5° C., or 0.0° C. The temperature of the primary conductor 3 and/or of the first housing 2 can be detected by means of the temperature detection device 5 as indicated in FIG. 1. This temperature detection device 5 can be equipped with one or with several sensors that are arranged on/at the primary conductor 3 and the first housing 2. The signals of the temperature detection device 5 are received by (transmitted to) the fault detection device 7 and they can be evaluated by it.

The drive means 6 of the charging device 1 is not subject to any particular limitations and it can include a drive means 6 that can be driven with an electric motor or pneumatically, as well as for example a threaded rod, and a hydraulic or a scissor lift. Faults can occur in the driving means 6 due to ice and/or snow in all and between all part components of the drive means 6. For example, the legs of a scissor lift can become frozen solid to each other, but so can also the contact location(s) with which for example a threaded rod is in contact in order to move the scissor lift.

If no movement of the first housing 2 takes place in spite of an initiation of a movement operation by the drive means 6 and optionally it is detected that the temperature of the primary conductor 3 and/or of the first housing 2 is below a pre-determinable first threshold value, the power electronics device 4 is controlled by the fault determination 7 in such a way that the primary conductor 3 is energized with an electric current to increase the temperature of the primary conductor 3. This energizing of the primary conductor 3 is preferably conducted for as long as required until the movement of the housing 2 can be carried out.

In this case, an electric current with a direct current component can be used as was already mentioned, which optionally has a suitable duty cycle. It can be further also provided that each time when the primary conductor 3 has been energized for a pre-determinable period of time, an attempt is made to initiate a movement of the first housing 2 with the drive means 6. If the movement operation can be carried out, the energizing of the primary conductor 3 with an electric current to increase the temperature of the primary conductor is stopped; otherwise, the energizing of the primary conductor 3 with an electric current is continued.

It goes without saying that the primary conductor 3 can be also continuously energized with an electric current to increase the temperature of the primary conductor 3 until the movement operation of the first housing 2 can be carried out. In both cases, the temperature (development) of the primary conductor 3, of the first housing 2 and/or of the performance electronics device 4 can be also taken into account. It can be also provided that the increase of the temperature of the primary conductor 3 and/or of the first housing 2 (and optionally also of the power electronics device 4) will occur only at a pre-determinable second threshold temperature. For the predetermined second temperature can be used for example +5° C., +10° C., +15° C., +20° C., 25° C., +30° C., +35° C., +40° C., +45° C., +55° C. or +60° C.

If a movement of the first housing 2 cannot be initiated despite a movement operation performed by the drive means 6, while the second precondition mentioned above is not met if the temperature is not below the predetermined first threshold temperature for the primary conductor 3 and/or for the first housing 2, it can be assumed that the fault is caused by ice and/or snow. In such a case, for example the fault detection device 7 can be configured to only generate a fault signal. Such a fault signal may be an optical signal that can be perceived visually by a person and/or an acoustic fault signal, but it may be also or it may comprise a radio signal, or an electric signal or electronic signal, which is for example transmitted to a service device.

It can also be provided that the fault detection device 7 is configured to generate a fault signal and to end energizing of the primary conductor 3 with an electric current so as to heat up the primary conductor 3 when no movement of the first housing 2 can take place even after a predetermined period of time with an attempted movement due to a fault.

As shown schematically also in FIG. 1, the power electronics device 4 can be arranged in a second housing 8 at a first position of the first housing 2 (or stowed in a retracted position), so that it is located adjacent to at least one outer surface of the first housing 2. The example illustrated in FIG. 1 is provided with a second housing 8 having a recess 9, which is provided with a suitable form and depth so that the first housing 2 can be accommodated in this first position (in the stowed or retracted position) in such a way that the upper side of the first housing 2 and at least one upper side of the second housing 8 are mutually aligned with each other. In this manner, a flush-mounted, compact and robust charging device can be provided, which can withstand for example high mechanical requirements (for example when it is run over by the tires of the vehicle). The second housing 8 can be formed from a suitable material or from any suitable material combination/material mixture, wherein a particular advantage is the fact that the second housing 8 is at least partially made of metal, while the metal is preferably selected from aluminum, an aluminum alloy, or stainless steel.

However, with such a configuration of the charging device 1, it cannot be excluded that with correspondingly low temperatures of opposite surfaces, the surfaces of the first housing 2 (in their first position) will be frozen solid to those of the second housing 8. The situation may be particularly critical in the edge regions indicated by the circles with dashed lines.

The energizing of the primary conductor 3 according to the invention has an effect not only on its increased temperature, but it also results in an increased temperature of the components of the power electronics device 4. The heat of the components of the power electronics device 4 can be discharged to the second housing 8. In particular when the second housing 8 is at least partially made of metal, the heat discharged from the power electronics 4 to the second housing 8 can be quickly distributed thanks to the good heat conductivity of metal through the second housing 8. Since the second housing 8 can be located immediately adjacent with at least one of its outer surfaces to at least one outer surface of the first housing 2, in the case when such a proximity is present, ice/snow located in the area between these outer surfaces is melted particularly quickly and the time period required until the movement operation can be carried out can be advantageously also kept to a minimum.

According to a preferred embodiment of the charging device 1, the charging device is designed as a ground-based device and it is configured in the installed state of the ground-based device to produce with a movement of the first housing 2 (from a first position to a second position) an arrangement providing an optimal distance of the first housing 2 and/or the most accurate overlapping with a separate secondary conductor of the charging device, wherein and electric current is induced by the alternating magnet field of the primary conductor 3, so that it can be transferred to a rechargeable storage device for storage of electric energy with this arrangement.

The drive means 6 of the charging device 1 can be also configured to tilt, pivot or shake the housing 2. In this manner, all the objects, foliage, dirt or moisture may be at least partially removed from the first housing 2 and animals can be scared away.

Similarly, the charging device 1 may also comprise a sensor device by means of which objects on at least one outer surfaces of the first housing 2, or also objects in an air gap, can be detected between the first housing 2 and an arrangement containing a second conductor (for example a charging plate or a housing with a secondary conductor arranged therein) of a motor vehicle that is (also) operated with an electric motor. The sensor arrangement can include for example a 2D or 3D camera system whose data are processed with a digital computing device for detection of objects, a light barrier, a motion detector and/or a metal detector.

The charging device 1 according to the present invention may also be provided with an arrangement of sensors and with a system such as those disclosed in the unpublished document DE 10 2014 000 747 whose entire content is hereby expressly incorporated in the present application.

For example, the charging device 1 can be provided with at least one imaging sensor device and with a control device, wherein the imaging sensor device is adapted to detect the area between the first housing 2 and the secondary conductor or the charging plate with the secondary conductor arranged therein, (the term "charging plate" often also includes a housing with a secondary conductor arranged therein), of a parked vehicle, and to transmit the detected data to a control unit, while the control unit is configured to assess the data of the imaging sensor device as to whether at least one object is located in the gap between the first housing 2 and the secondary conductor or the charging plate with the secondary conductor of the parked vehicle arranged therein, and/or to assess at what vertical distance are the first housing 2 and the secondary conductor or the charging plate located relative to each other and to the secondary conductor of the parked vehicle arranged therein.

The control unit can be also adapted to transmit to the fault detection device 7 at least one control signal for stopping or suppressing the generation of an alternating magnetic field with the primary conductor 3, if and/as long an object is located in the gap between the first housing 2 and the secondary conductor or the charging plate with the secondary conductor of the parked vehicle arranged therein.

The control unit may be also configured to be capable of transmitting to the charging device 1 and/or to a motor vehicle, so that the distance between its secondary conductor or its charging plate with the secondary conductor arranged therein on an adjustable floor can be adjusted, at least one control signal by means of which in particular a vertical movement of the first housing 2, and optionally also in particular a vertical movement of the charging plate provided with a secondary conductor of the motor vehicle arranged therein, can be varied, as well as optionally a vertical movement of the floor of the motor vehicle along with the vertical distance between the first housing 2 and the secondary conductor or the charging plate of the vehicle provided with the secondary conductor.

The imaging sensor arrangement preferably comprises at least a 3D camera device for visible light, a 3D camera device for infrared light, a radar device, and/or a time-of-flight device, wherein at least a laser scanner, particularly a 3D laser scanner, is particularly preferred.

The charging device 1 according to the present invention can be also provided with a system that is suitable for the present invention according to 10 20014 000 747, which is adapted to carry out, at least as a partial function, one of the following functions: parking assistance, garage door status test, detection of objects present in the vicinity of the vehicle, parking free/occupied status detection and/or detection of the movement of objects.

The present invention also comprises a method for operating a charging device according to the invention as well as advantageous further developments and embodiments thereof. With respect to this method and its further developments, reference is made to the embodiments mentioned above.

According to the method, the energizing of the primary conductor can be conducted in a preferred manner until the movement operation of the first housing can be carried out.

Other preferred developments and embodiments of the method can also include the following additional steps:

monitoring of the gap between the first housing of the charging device and a secondary conductor or a charging plate with a secondary conductor of a parked vehicle, whose charging plate is positioned relative to the first housing in such a way that an alternating magnetic field is generated in the secondary conductor of the vehicle by a signal generated by the alternating magnetic field of the primary conductor, conducted by means of a system that is provided with at least one imaging sensor device.

Detection of the gap between the first housing and the secondary conductor or the charging plate with the secondary conductor of a parked motor vehicle is performed by means of the imaging sensor device, followed by transmission of the detected data to the control unit, and assessment of the data of the imaging sensor device by the control unit as to whether at least one object is located in the gap between the charging plate of the stationary charging device and the charging plate of the parked vehicle and/or what is the vertical distance between the charging plate of the stationary induction charging device and the charging plate of the parked motor vehicle.

In this case, at least one control signal is transmitted in another step from the control unit to the charging device and/or to the fault detection device of the charging device in order to stop or suppress the generation of an alternative magnetic filed by the primary conductor, if and/or as long as an object is located between the first housing 2 and the secondary conductor or the charging plate with the secondary conductor of the parked vehicle.

Other embodiments and further developments of the method according to the invention are obtained from the disclosure of the charging device, its further development and embodiments, the described forms of the embodiments, and from the figures and their description.

The fault detection device 7 for the charging device 1 can be for example a digital computing device in which is installed an executable program. The computing device is in this case provided with the required inputs and output. The fault recognition device 7 and the control unit can be separate devices, or their functions can be concentrated in a single device.

Since the arrangements that are required for the charging device 1 are known to persons skilled in this art and so are the required devices, apparatuses, components, parts, etc., and their possible interactions and the possibilities for generating and transmitting signals (with wired means, wirelessly, by means of a bus system, in an unencrypted manner, electrically, electronically, optically, etc.) are also known, they do not need to be discussed in detail in the present application.

With the development and application of a charging device for inductive transmission of electric energy provided with a first housing that can be moved in one direction (at least in a vertical direction when the charging device is installed on the ground), in which is arranged a primary conductor, the problem encountered with such a device is that the movement of the first housing may be prevented by ice and/or snow and a proper function of the charging device then cannot be ensured.

According to the invention, in a charging device for inductive transmission of electric energy, a primary conductor (primary coil) provided therein is systemically energized with an electric current to increase the temperature of the primary conductor, The primary conductor is thus heated in this manner and ice and/or snow which is/are located at the first housing and/or the drive means are melted to render them neutral to the component parts.

The invention claimed is:

1. A charging device for inductive transmission of electric energy, comprising:
    a primary conductor arranged in a first housing, which produces energizing of an alternating magnetic field with an alternating current;

a power electronics device, which is electrically connected to the primary conductor and which is electrically connected to a power supply system with alternating current;

a drive means for moving the first housing from a first position to a second position, wherein the charging device is provided with a fault detection device, which detects whether the first housing is or is not moved when a movement operation has been initiated with the drive means, and which is configured, in the case when a movement of the first housing does not take place, although a movement operation has been initiated with the drive means, to control the power electronic device in such a way that the primary conductor is energized with an electric current to increase a temperature of the primary conductor in that the temperature of the primary conductor is below a predetermined first threshold temperature;

a temperature detection device for detecting the temperature of the primary conductor and of the first housing; and the fault detection device, which receives the signals of the temperature detection device and which is configured, in the case when a movement of the housing does not take place although a movement operation has been initiated by the drive means, and the temperature of the first hosing is below the pre-determinable first threshold temperature, to exercise control with the power electronics device that is configured to exercise control so that the primary conductor is energized by an electric current in order to increase the temperature of the primary conductor.

2. The charging device according to claim 1, wherein the fault detection device is configured, in the case when a movement of the first housing does not take place, although a movement operation has been initiated with the drive means, to control the power electronics device in such a way, that the primary conductor is energized with an electric current having a direct current component in order to increase the temperature of the primary conductor.

3. The charging device according to claim 1, wherein the fault detection device is adapted to control the power electronics device in such a way, that the temperature of the primary conductor and of the first housing is increased when the primary conductor is energized with an electric current in order to increase to temperature of the primary conductor to a pre-determinable second threshold temperature.

4. The charging device according to claim 1, wherein the power electronics device is arranged in a second housing, wherein at least one outer surface of the second housing is arranged so that it is immediately adjacent with a first position of the first housing to at least one outer surface of the first housing.

5. The charging device according to claim 4, wherein the second housing is made at least partially of a metal.

6. The charging device according to claim 1, wherein the power electronics device is configured to energize the primary conductor for an inductive transmission of electric energy with an alternating current with a frequency in the range from 50 kHz to 100 kHz, preferably 70 kHz to 100 kHz, particularly preferably from 80 kHz to 90 kHz.

7. The charging device according to claim 1, wherein the charging device is configured as a ground-based charging device and that the drive means is adapted in an installed state of the ground-based charging device to achieve a distance that is as optimal as possible and overlapping that is as accurate as possible with a movement of the first housing relative to one of secondary conductors separated from the charging device so as to create an arrangement in which an electric current is induced with the alternating magnetic field of the primary conductor, which is transmitted to a rechargeable storage device for electric energy used by the facility.

8. The charging device according to claim 1, the drive means is also adapted to tilt, pivot or shake the first housing.

9. The charging device according to claim 1, further comprises:

a sensor arrangement by which objects are detected on at least one outer surface of the first housing.

10. A method for operating a charging device, comprising:

providing a charging device;

detecting by a fault detection device of the charging device whether a first housing is or is not moved when a movement operation has been initiated by a drive means; and in case when a movement of the first housing initiated by the drive means has not been detected, controlling a power electronics device with the fault detection device in such a way, that a primary conductor of the first housing is energized with an electric current in order to increase a temperature of the primary conductor in that the temperature of the primary conductor is below a predetermined first threshold temperature;

detecting the temperature of the primary conductor and of the first housing by means of a temperature detection device; and in the case when a movement of the first housing does not take place although a movement operation has been initiated with the drive means and the temperature of the first housing is below the pre-determinable first threshold temperature, controlling the power electronics device in such a way that the primary conductor is energized with an electric current in order to increase the temperature of the primary conductor.

11. The method according to claim 10, wherein in the case when the detection of the fact that a movement of the first housing has not taken place when a movement operation has been initiated, the fault detection device controls the power electronics device in such a way that the primary conductor is energized with an electric current that has a direct current component in order to increase the temperature of the primary conductor.

12. The method according to the claim 10, wherein the power electronics device is controlled with the fault detection device in such a way that the temperature of the primary conductor and/or of the first housing is increased by the energizing of the primary conductor with an electric current in order to increase the temperature of the primary conductor to a pre-determinable second threshold temperature.

* * * * *